(12) United States Patent
Venturelli et al.

(10) Patent No.: US 11,379,842 B2
(45) Date of Patent: Jul. 5, 2022

(54) METHOD AND SYSTEM FOR DETECTING FRAUDULENT TRANSACTIONS USING A FRAUD DETECTION MODEL TRAINED BASED ON DYNAMIC TIME SEGMENTS

(71) Applicant: INTUIT INC., Mountain View, CA (US)

(72) Inventors: Henry Venturelli, San Francisco, CA (US); Runhua Zhao, San Jose, CA (US); Damayanti Sengupta, Seattle, WA (US); Nicholas John Stang, Minneapolis, MN (US); Zeyu Li, Los Angeles, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 16/841,967

(22) Filed: Apr. 7, 2020

(65) Prior Publication Data
US 2021/0312455 A1    Oct. 7, 2021

(51) Int. Cl.
*G06Q 20/40* (2012.01)
*G06N 3/04* (2006.01)
*G06N 20/00* (2019.01)

(52) U.S. Cl.
CPC ........... *G06Q 20/4016* (2013.01); *G06N 3/04* (2013.01); *G06N 20/00* (2019.01)

(58) Field of Classification Search
CPC ....... G06Q 20/4016; G06N 20/00; G06N 3/04
USPC ......................................................... 705/35
See application file for complete search history.

(56) References Cited

U.S. PATENT DOCUMENTS

2019/0295114 A1* 9/2019 Pavletic ............... G06K 9/6256
2020/0134628 A1* 4/2020 Jia ......................... G06N 20/00

FOREIGN PATENT DOCUMENTS

CN           109615454 A  *  4/2019  ......... G06Q 20/4016

OTHER PUBLICATIONS

TensorFlow Authors, "Ragged tensors", 2018, https://colab.research.google.com/github/tensorflow/docs/blob/master/site/en/guide/ragged_tensor.ipynb#scrollTo=5DP8XNP-6zlu (Year: 2018).*

* cited by examiner

*Primary Examiner* — Hani M Kazimi
*Assistant Examiner* — Alison L. Lamb
(74) *Attorney, Agent, or Firm* — Patterson + Sheridan, LLP

(57) ABSTRACT

Certain aspects of the present disclosure provide techniques for detecting fraudulent transactions in a transaction processing system. An example method generally includes receiving a request to process a transaction. An input data set including a vector representing the transaction and a plurality of vectors representing historical transactions is generated. The input data set is divided into a plurality of ragged tensors corresponding to non-overlapping time segments of variable length and having a plurality of vectors associated with dates within each time segment A reduced input data set is generated by generating, for each respective ragged tensor of the plurality of ragged tensors, a respective representative vector using max pooling over vectors in the ragged tensor. A fraudulent transaction score is generated based on the reduced input data set using a fraud detection model. The transaction is processed based, at least in part, on the fraudulent transaction score.

15 Claims, 8 Drawing Sheets

METHOD AND SYSTEM FOR DETECTING FRAUDULENT TRANSACTIONS USING A FRAUD DETECTION MODEL TRAINED BASED ON DYNAMIC TIME SEGMENTS

INTRODUCTION

Aspects of the present disclosure generally relate to fraud detection in transaction processing systems, and more specifically to detecting fraudulent transactions using machine learning models.

BACKGROUND

Transaction processing systems are used to process a variety of transactions, such as purchases, returns, and the like. In some cases, transaction processing systems may be configured to determine whether an incoming transaction is legitimate or fraudulent and complete processing of the transaction based on the determination. Generally, transactions determined to be legitimate may be completed, while transactions determined to be fraudulent may be blocked from completion. Fraud detection may be based on various characteristics of a transaction, such as an amount of the transaction, a location of the transaction, and other information that identifies various characteristics of the transaction.

Fraud detection systems generally are trained using a transaction history for a party. Using a transaction history for one party to train a fraud detection model may result in a trained fraud detection model that generates accurate fraud predictions for that party but may not generate accurate fraud predictions for other parties. Further, for parties that have no transaction history (e.g., parties that are beginning to use a transaction processing system), a fraud detection model generated from transaction histories associated with similar parties may also be inaccurate. Inaccurate predictions of whether a transaction is fraudulent may result in both false positives (i.e., legitimate transactions being blocked because they are deemed fraudulent) and false negatives (i.e., fraudulent transactions being processed because they are deemed legitimate). This may result, for example, in processing delays for legitimate transactions that are blocked and the processing of fraudulent activity through a transaction processing system.

Accordingly, techniques are needed to accurately detect fraudulent transactions in computer-based transaction processing systems.

BRIEF SUMMARY

Certain embodiments provide a computer-implemented method for training a fraud detection model to detect fraudulent transactions in a transaction processing system. An example method generally includes receiving a training data set including a plurality of vectors. Each respective vector may be associated with a date at which a transaction associated with the respective vector occurred. The received training data set is divided into a plurality of ragged tensors. Each ragged tensor may correspond to a non-overlapping time segment of variable length and having a plurality of vectors associated with dates within the time segment. A reduced training set is generated by generating, for each respective ragged tensor of the plurality of ragged tensors, a respective representative vector using max pooling over vectors in the ragged tensor. A fraud detection model is trained based on the reduced training data set.

Other embodiments provide a computer-implemented method for detecting fraudulent transactions in a transaction processing system. The method generally includes receiving a request to process a transaction. An input data set including a vector representing the transaction and a plurality of vectors representing historical transactions is generated. The input data set is divided into a plurality of ragged tensors. Each ragged tensor may correspond to a non-overlapping time segment of variable length and having a plurality of vectors associated with dates within the time segment. A reduced input data set is generated by generating, for each respective ragged tensor of the plurality of ragged tensors, a respective representative vector using max pooling over vectors in the ragged tensor. A fraudulent transaction score is generated based on the reduced input data set using a fraud detection model. The transaction is processed based, at least in part, on the fraudulent transaction score.

Still further embodiments provide a system comprising a processor and a non-transitory computer-readable memory storing instructions that, when executed by the processor, perform an operation for detecting fraudulent transactions in a transaction processing system. The method generally includes receiving a request to process a transaction. An input data set including a vector representing the transaction and a plurality of vectors representing historical transactions is generated. The input data set is divided into a plurality of ragged tensors. Each ragged tensor may correspond to a non-overlapping time segment of variable length and having a plurality of vectors associated with dates within the time segment. A reduced input data set is generated by generating, for each respective ragged tensor of the plurality of ragged tensors, a respective representative vector using max pooling over vectors in the ragged tensor. A fraudulent transaction score is generated based on the reduced input data set using a fraud detection model. The transaction is processed based, at least in part, on the fraudulent transaction score.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
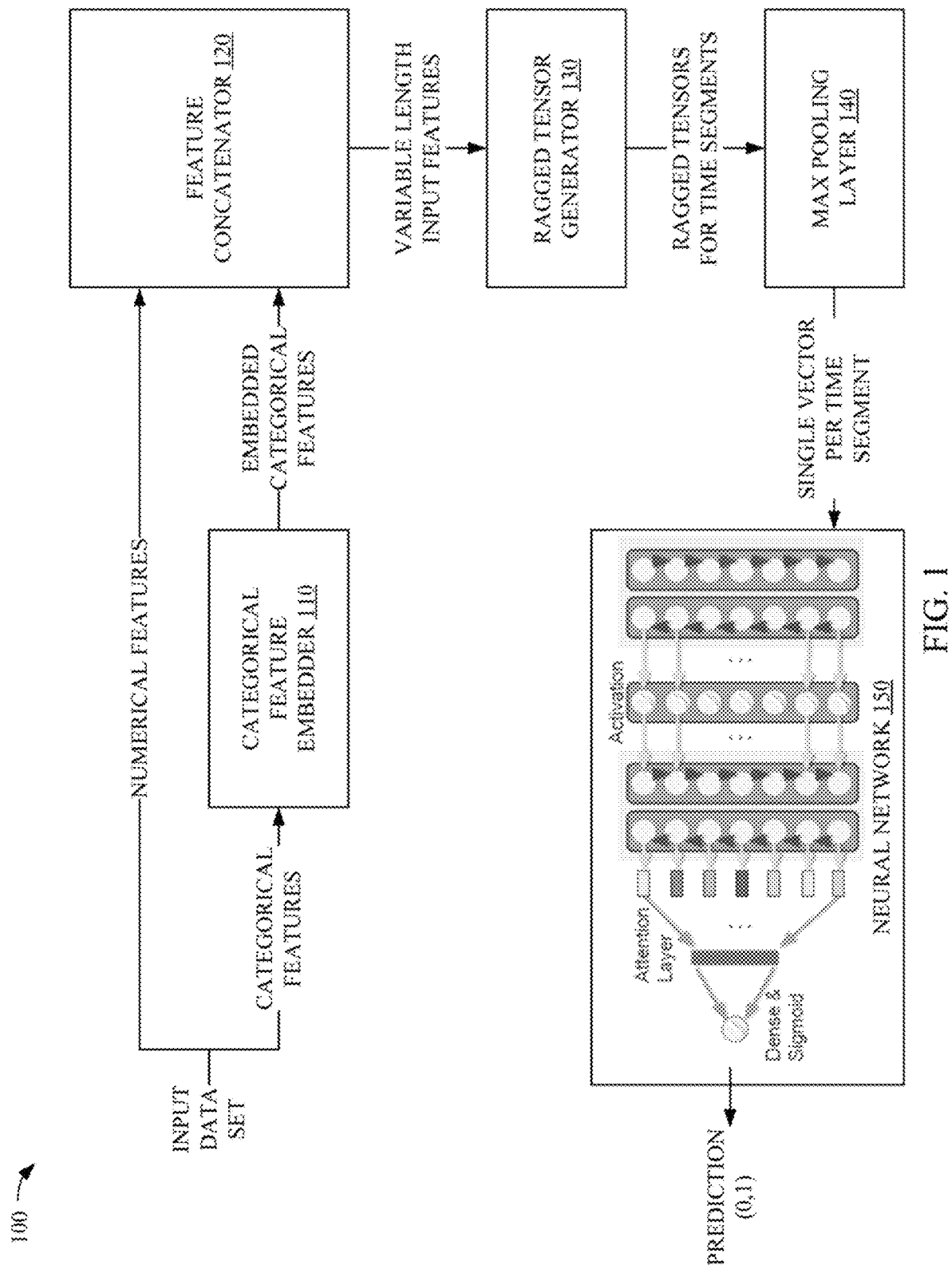
FIG. 1 illustrates an example fraud detection model training pipeline in which a training data set of transactions organized into variable length time windows is used to train a fraud detection model.

Aspects of the present disclosure provide apparatuses, methods, processing systems, and computer readable mediums for identifying fraudulent transactions in a transaction processing system using machine learning models.

Fraud detection systems that determine whether transactions are fraudulent or legitimate are generally used to block processing of fraudulent transactions in a transaction processing system. Generally, fraud detection systems can estimate a probability or other score indicating whether a given transaction is fraudulent based on information about a transaction, such as location data, the parties involved in the transaction, the total amount of the transaction, line item information for items included in the transaction, and the like. If the estimated probability or score exceeds a defined threshold probability or score, the fraud detection systems can block completion of the transaction.

Many fraud detection systems are trained using a training data set of transactions that are labeled with an indication of whether the transaction is legitimate or fraudulent. However, the a priori labeled data may be particular to a specific party. Thus, the predictions of whether transactions are legitimate or fraudulent may also be particular to that party.

Further, many fraud detection systems consider each transaction independently or consider transactions over fixed periods of time. When each transaction is considered independently, time relationship information between transactions may be lost, even though timing information may provide valuable clues as to whether a transaction or pattern of transactions is fraudulent. When transactions are considered over fixed periods of time, some of the timing relationship information between different transactions in a transaction history may also be lost, as blocks of transactions may be considered independently of the timing relationships between each block of transactions.

Embodiments presented herein improve the accuracy of fraud detection in transaction processing systems by training a fraud detection model using an input data set of transactions organized into time windows of varying lengths of time. In some embodiments, the transactions in each window are organized into ragged tensors with a variable number of transactions, and each ragged tensor is reduced to a single vector representative of the transactions included in the ragged tensor so that each time window is represented by a single vector. The resulting collection of single vectors for each time window is used to train a fraud detection model. By using representative vectors generated over a plurality of transactions in variable-length time windows to train a fraud detection model, the user's transaction history and timing relationships between transactions in the user's transaction history may be considered in determining whether transactions are fraudulent or legitimate. Further, using these representative vectors may allow for transactions or activity that occurred in the distant past, along with the timing gaps between these transactions, to be considered in training the fraud detection model, especially where large gaps exist between transactions in a user's transaction history or where it would be impractical to create a neural network large enough to evaluate the oldest transactions or activity that occurred in the user's transaction history.

Example Pipeline for Training a Fraud Detection Model and Detecting Fraudulent Transactions Using an Input Data Set of Transactions Organized into Variable Length Time Segments FIG. 1 illustrates an example machine learning pipeline 100 in which an input data set of transactions organized into variable length time segments is used to train a fraud detection model and a trained fraud detection is used to predict whether a transaction is fraudulent using an input data set of transactions organized into variable length time segments, according to embodiments described herein. As illustrated, machine learning pipeline 100 includes a categorical feature embedder 110, feature concatenator 120, ragged tensor generator 130, max pooling layer 140, and neural network 150.

An input data set input into the machine learning pipeline 100 may include records for a plurality of transactions in a user's transaction history. Each record in the input data set may include numerical features and categorical features. For example, in a transaction processing system, records in the input data set may include information such as an amount of a transaction, a date and time at which the transaction occurred (which can be represented as a numerical value identifying a number of seconds that has elapsed from a fixed set time, such as a Unix-compatible timestamp which represents time as a number of seconds that has elapsed from midnight UTC on Jan. 1, 1970), and the like. Categorical features generally represent features that can be represented as a selection from a set of fixed values for a feature. For example, in a transaction processing system, categorical features may include a type of payment (e.g., cash, check, credit card), a type of a credit card used, and the like.

To generate an input data set that can be used to train a fraud detection model or determine whether a transaction is likely to be a legitimate or fraudulent transaction, the categorical features in the input data set may be processed by categorical feature embedder 110 to generate embedded categorical feature values for each record in the input data set. Categorical feature embedder 110 can generate embedding features, for example, as numerical values, with each numerical value corresponding to a different value of the finite set of values for a categorical feature. In some embodiments, categorical feature embedding layer 110 can generate a plurality of embedding values $v_1, v_2, \ldots, v_n$ for a categorical feature. Each combination of values $\{v_1, v_2, \ldots, v_n\}$ may be associated with a specific value of the finite set of values for a categorical feature. For example, in a transaction processing system in which a type of credit card used to complete a transaction is a categorical feature, a first type of credit card may be associated with the embedding values $\{-0.45747, 0.34343, 0.00011, -0.01234\}$, and a second type of credit card may be associated with the embedding values $\{-0.76796, 0.45432, -0.11111, 0.54650\}$. These embedding values may be used, as discussed in further detail below, to replace categorical, non-numeric data in the input data set with numerical data so that a machine learning model can be trained or an inference can be performed using wholly numerical data.

Feature concatenator 120 combines the numerical features in the input data set and the embedded categorical features generated by categorical feature embedding layer 110 to generate an input data set with variable length input features. The transactions may have variable lengths, for example, based on a variety of transaction properties, such as a form of payment (e.g., credit card payments may be associated with an additional feature identifying a type of the credit card that may not be present for transactions settled by cash or check), whether the transaction is shipped or picked up (where a shipped transaction may include shipping address information as a feature, while a picked up transaction may include some other information identifying a store at which the items in the transaction are to be picked up), and the like. Generally, feature concatenator 120 replaces categorical features in the input data set with the embedded categorical features such that non-numerical categorical features are replaced with numerical data representing different discrete values of the categorical features. Using the example discussed above, a transaction record including an indication that the first type of credit card was used in the transaction may be replaced with the embedding values {−0.45747, 0.34343, 0.00011, −0.01234}, while a transaction record including an indication that the second type of credit card was used in the transaction may be replaced with the embedding values {−0.76796, 0.45432, −0.11111, 0.54650}. The vectors generated by feature concatenator 120 may have a variable number of features, where vectors associated with transactions that do not include a particular categorical feature are shorter than vectors associated with transactions that include that particular categorical feature.

In some embodiments, where a record in the input data set does not include a value for a categorical feature, feature concatenator 120 can pad the record so that each record includes the same number of features. For example, suppose that a transaction record indicates that a transaction was settled by check instead of by credit card. Because no embedding features are defined for a credit card type in a check transaction, additional features can be added with padding values for the credit card type embedding values so that each record in the input data set has the same number of features. The padding values may, for example, be a predefined set of values, 0, a minimum or maximum value defined for a data type, or the like.

Figure 3:
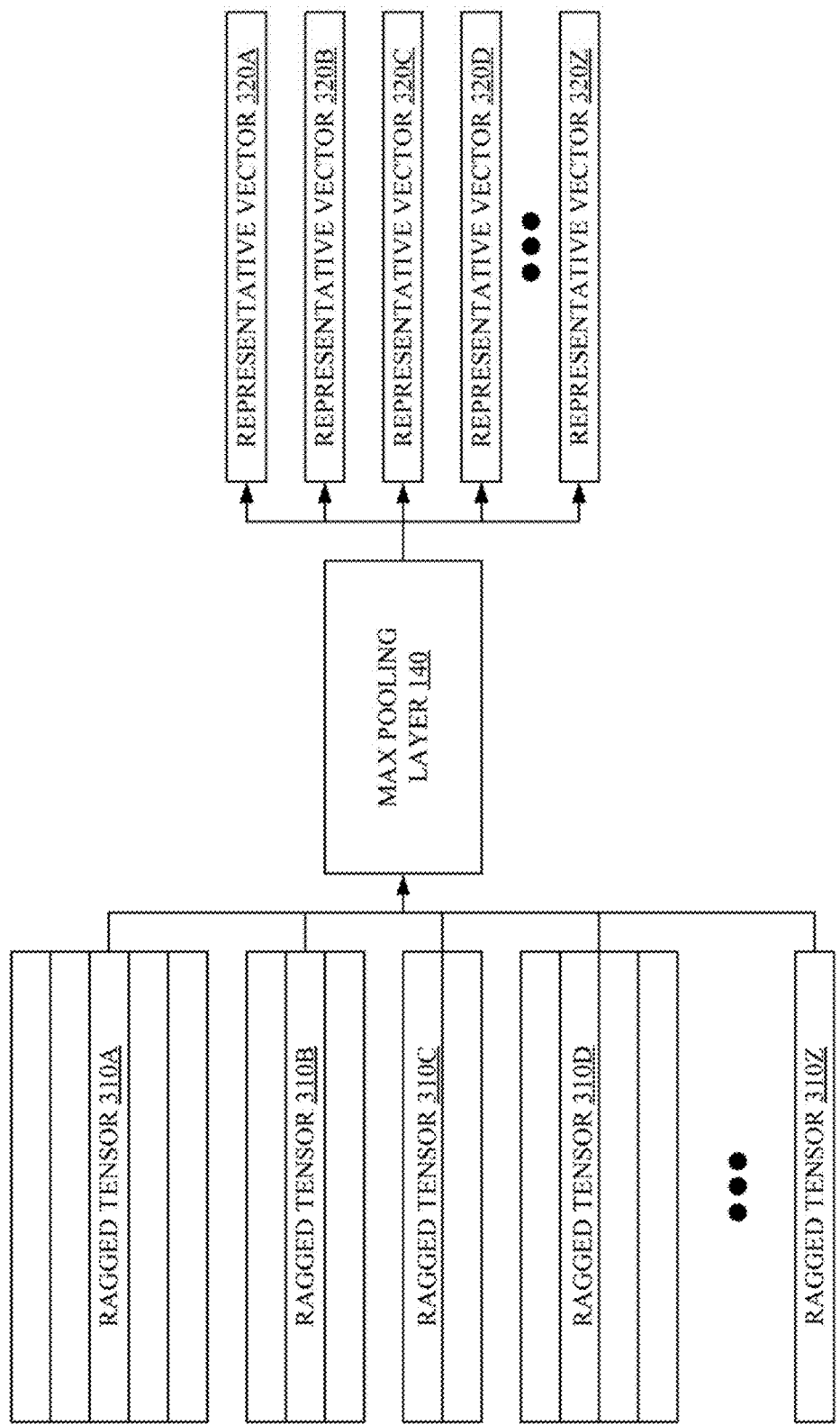
FIG. 3 illustrates an example reduction of ragged tensors including a plurality of transaction records over variable length time windows into representative vectors used in training a fraud detection model.

Ragged tensor generator 130 uses the variable length input features to generate a plurality of ragged tensors, with each ragged tensor representing a non-overlapping period of time in which transactions were performed by a user of a transaction processing system. Generally, a ragged tensor is a collection of vectors (e.g., representing different transactions) that fall within a non-overlapping period of time. A ragged tensor may include a variable number of vectors, as a varying number of transactions may occur within the time segment covered by each ragged tensor generated from the input data set, as illustrated in FIG. 3 below.

To generate a ragged tensor, ragged tensor generator 130 can search the transaction records in the input data set for transaction records associated with transactions performed during a specific time segment. Records associated with actions performed during the specific time segment may be organized into one ragged tensor, and records associated with actions performed outside of the specific time segment may be organized into different ragged tensors.

In one example, ragged tensor generator 130 can generate a plurality of ragged tensors associated with a given user based on a splitting vector. Generally, a splitting vector is a vector including information defining how the input data set is to be divided into the plurality of ragged tensors. This information generally includes a total number of ragged tensors to generate from the input data set and information usable by a mapping function to assign vectors in the input data set to different ragged tensors.

A splitting vector may include a plurality of indices, and each index may include a length of a time segment and the number of time segments generated using the specified length. For example, a splitting vector may specify that an input data set associated with a user should be split into a first number of ragged tensors associated with a first time segment length (which may be the shortest time segment), a second number of ragged tensors associated with a second time segment length, a third number of ragged tensors associated with a third time segment length, and a ragged tensor in which the remainder of the input data set is organized. Table 1 below illustrates an example splitting vector:

TABLE 1

Example Splitting Vector for Generating Ragged Tensors From a Training Data Set

| Index | Time Segment Length | Number of Tensors |
| --- | --- | --- |
| 1 | 10 minutes | 6 |
| 2 | 1 hour | 671 |
| 3 | 1 week | 48 |
| 4 | All activity older than 1 year | 1 |

As illustrated, the first index results in the generation of six ragged tensors covering ten minutes each. The second index results in the generation of 671 ragged tensors covering one hour each. The third index results in the generation of 48 ragged tensors covering one week each. Finally, the fourth index results in the generation of a single ragged tensor covering the remainder of the input data set. The resulting set of ragged tensors thus includes six tensors covering an hour prior to training of the model, 671 tensors representing each hour over a 28 day period prior to training of the fraud detection model, 48 tensors representing each week over a one year period, apart from the four week period covered by the tensors generated using the first and second indices, and a single tensor representing the remainder of the user's transaction history. The indices in the splitting vector may additionally (though not illustrated) include information about a temporal ordering for each ragged tensor. The temporal ordering may illustrate which ragged tensor comes first. For example, using the first index as an example, the temporal ordering may indicate that the first of these six tensors includes transactions up to 10 minutes prior to the latest transaction in the transaction history; the second includes transactions from 11-20 minutes prior to the latest transaction in the transaction history; the third includes transactions from 21-30 minutes prior to the latest transaction in the transaction history; and so on.

Max pooling layer 140 uses the ragged tensors generated by ragged tensor generator 130 to generate an input data set including a single representative vector for each time segment in which the input data set is organized. Generally, max pooling layer 140 selects the maximum value across the transaction records included in a ragged tensor for each feature to generate the single representative vector for each time segment. Using max pooling layer 140, the number of vectors included in an input data set may thus be reduced from the total number of transactions included in the input data set to the number of ragged tensors generated from the input data set. More generally, max pooling layer 140 can reduce a ragged tensor associated with a non-overlapping time segment into a standard-sized representation for each non-overlapping time segment so that each time segment used by neural network 150 to train a fraud detection model or to determine whether a transaction is likely to be legitimate or fraudulent is represented by a single vector.

Neural network 150 uses the single vectors for each time segment generated by max pooling layer 140 to train a fraud detection model that can be used in a transaction processing engine to detect and block fraudulent transactions from occurring. In some cases, neural network 150 may train a fraud detection model using a variety of deep learning architectures that are capable of learning based on time relationships, such as recurrent neural networks. For example, the fraud detection model may be trained using a bi-directional long-short term memory (LSTM) architecture that is capable of learning order dependence (e.g., timing relationships) between different transactions in the input data set. A bi-directional LSTM model may be used because an LSTM preserves and recognizes temporal relationships in making a prediction of whether a transaction is legitimate or fraudulent. Thus, bi-directional LSTM can be used to recognize patterns of activity that may be indicative of fraudulent behavior, such as large gaps in time between successive transactions, irregularity in a pattern of transactions, and the like. For example, transactions that occur regularly may be recognized by a bi-directional LSTM model as legitimate, since there is a history of such a transaction occurring on a regular basis. However, timing outliers, such as a transaction that occurs after a gap in time larger than a typical gap in a user's transaction history, may be recognized as potentially fraudulent by the bi-directional LSTM model due to a lack of such a time gap relationship between successive transactions in a transaction history used to train the bi-directional LSTM model. Other models that preserve and recognize temporal relationships, such as gated recurrent units (GRUs), hierarchical attention mechanisms, convolutional neural networks, and the like may also be used to train a fraud detection model and predict whether transactions are likely to be legitimate or fraudulent.

Neural network 150 may also use the single vectors for each time segment to generate a prediction of whether a transaction is likely to be legitimate or fraudulent. The prediction may be, for example, a value between a defined minimum and maximum, where values closer to the defined minimum value are likely to be legitimate and values closer to the defined maximum value are likely to be fraudulent (or vice versa). Generally, neural network 150 may output the prediction to a transaction processing engine for use in finalizing the processing of a transaction, as discussed in further detail below.

Neural network 150, as illustrated, may be structured as a bidirectional neural network including an activation function, an attention layer, and a dense and sigmoid function that results in the generation of a prediction based on an input data set. The activation function may be structured as a plurality of layers including a plurality of neurons, with neurons in each layer being connected sequentially within the layer and connected to a corresponding neuron in a successive layer. In embodiments where the neural network 150 is implemented as a bi-directional LSTM, the activation function may be, for example, a logistic sigmoid function, a hyperbolic tangent function, or other functions that can serve as an activation function in a neural network. The output of the activation function may be processed through an attention layer, which reduces the output of the activation function to a smaller set of data. The output of the attention layer may be further processed by a dense and sigmoid function, which generates a probability score indicating whether a transaction is likely to be fraudulent or legitimate.

Figure 2A:
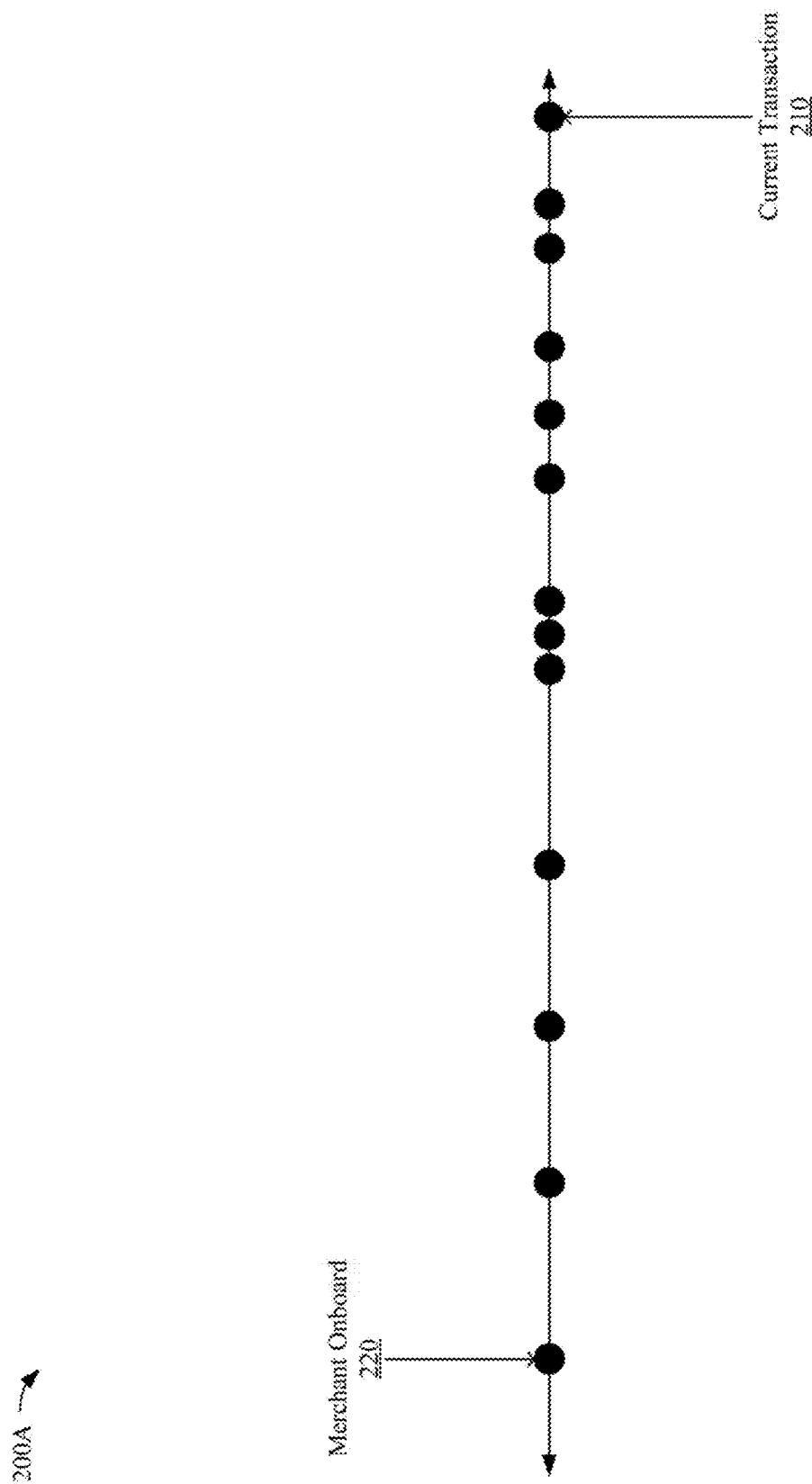
FIGS. 2A-2C illustrates example timelines of transactions in a training data set and division of the timelines into time windows for use in training a fraud detection model.
Figure 2B:
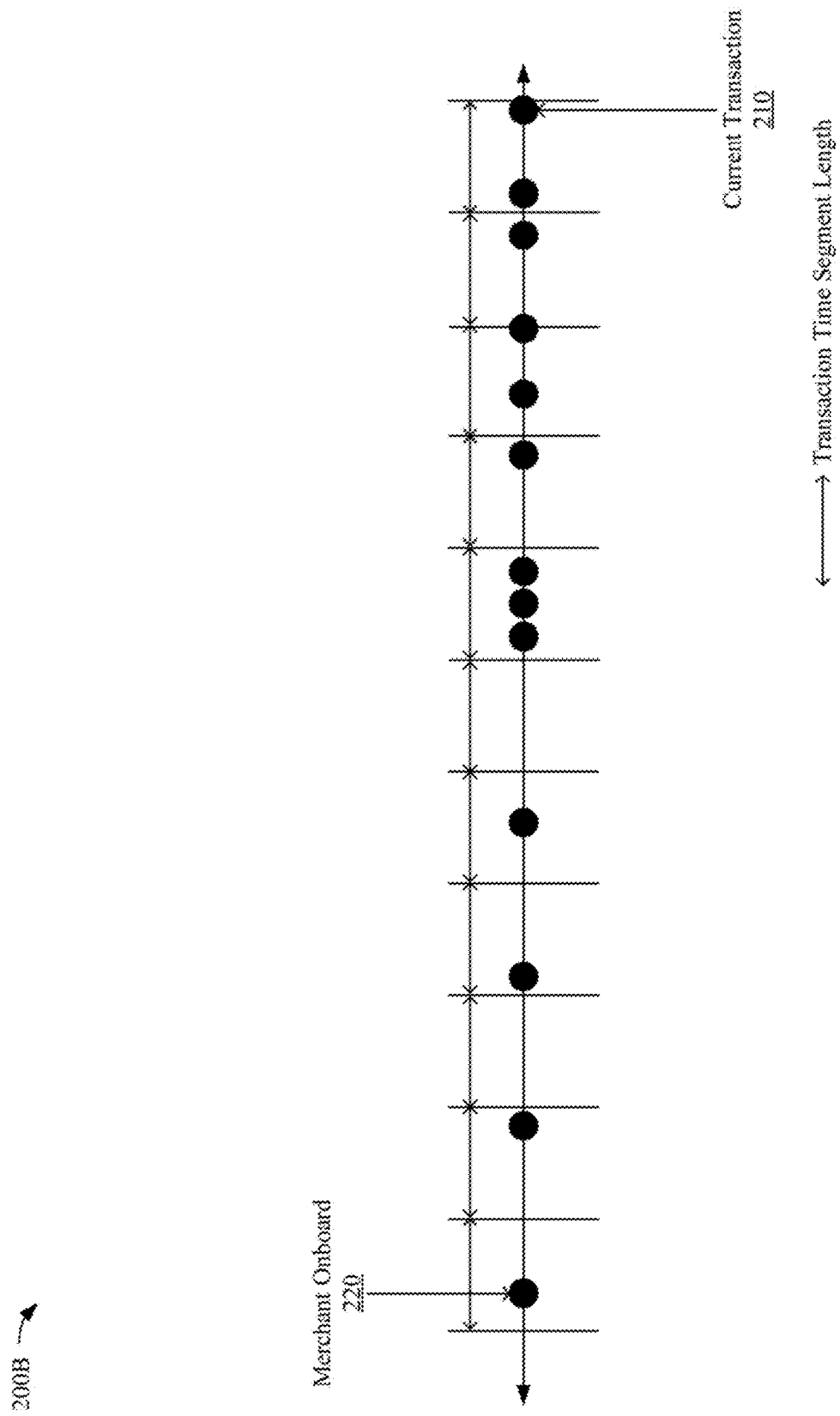
Figure 2C:
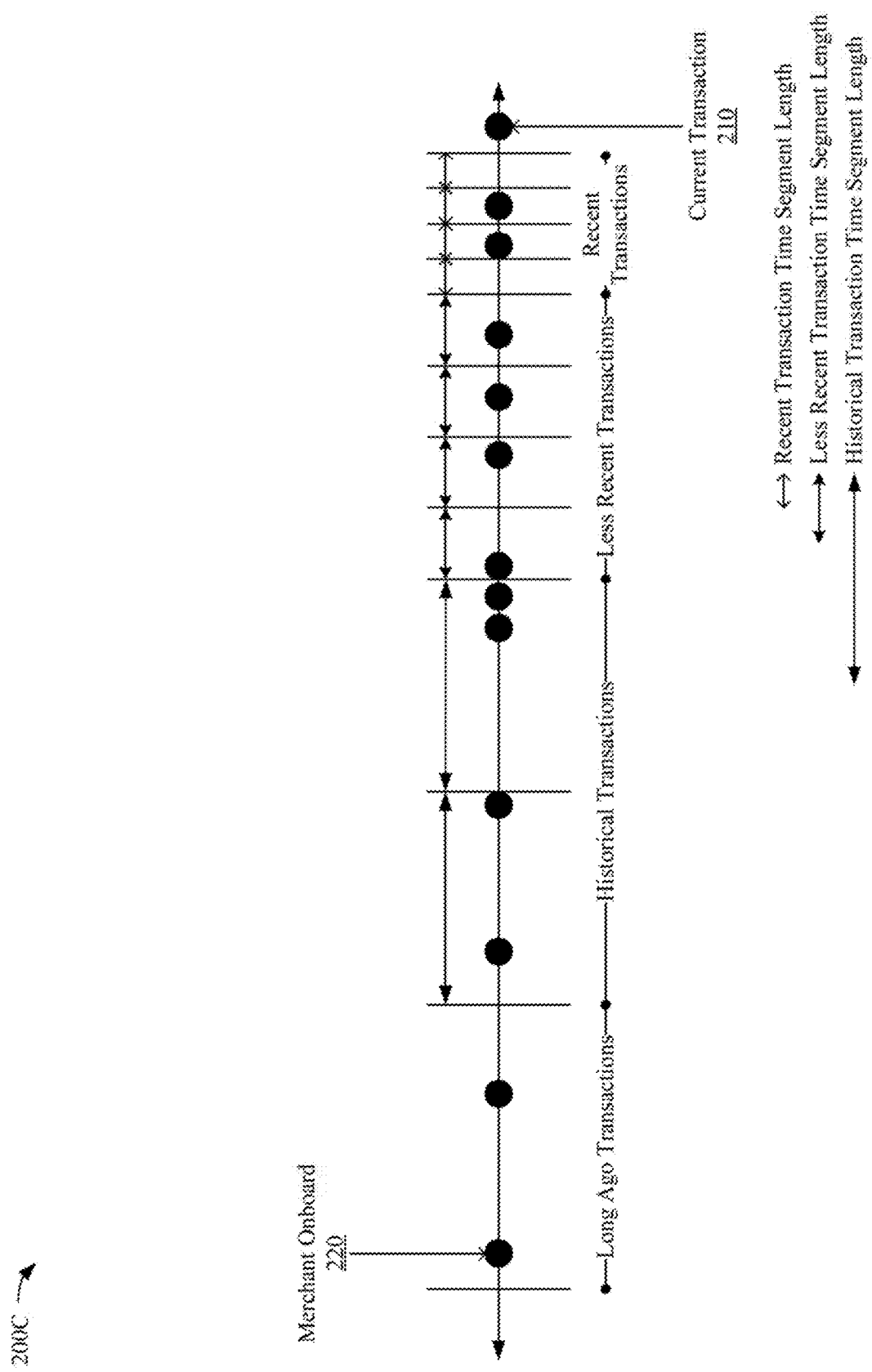

Example Organization of a Training Data Set of Transactions into Variable Length Time Segments FIGS. 2A-2C illustrates example timelines 200 of transactions in a transaction input data set that is used to train a fraud detection model.

As illustrated, the timeline 200 includes a plurality of transactions, including a current transaction 210 and a merchant onboard transaction 220. Current transaction 210 may represent a transaction for which a prediction of whether the transaction is legitimate or fraudulent is requested from a fraud detection model, and merchant onboard transaction 220 may represent the first transaction associated with a user of the transaction processing system. A number of other transactions between the current transaction 210 and merchant onboard transaction 220 may have occurred, and each of these transactions may be included in a training data set for the user.

FIG. 2A illustrates an example timeline 200A in which transactions in the transaction history are not segmented into time segments for use in training a machine learning model and determining whether a transaction is legitimate or fraudulent. In this example, each transaction may be considered in training a machine learning model and predicting whether a transaction is legitimate or fraudulent. Because each transaction in a transaction history may be considered, there may be minimal information loss in an input data set used to train or perform an inference using a transaction history. However, because a transaction history for each user for which a model is trained may vary in a number of transactions associated with each user, there may be significant variances in the amount of data used to train and perform an inference for each user. Users with large transaction histories may, for example, experience accurate inferences and diminished performance due to the number of transactions considered by a neural network. Users with small transaction histories, in contrast, may experience diminished accuracy in the inferences generated by a neural network but with higher performance (e.g., quicker generation of inferences).

FIG. 2B illustrates an example timeline 200B in which transactions in the transaction history are divided into equal-length time segments. In this example, the transactions in each time segment may be reduced into a single representative vector for each time segment. By reducing the transactions in a transaction history into a set of single representative vectors, the size of the input data set may be reduced relative to the size of the training data set discussed above with respect to FIG. 2A. That is, instead of analyzing each transaction independently, a plurality of transactions within a time window may be reduced into a single vector. Because the input data set may be smaller than the entirety of the transaction history, training of a fraud detection model and inferences performed by the fraud detection model may be accelerated relative to the use of individual transactions discussed above. However, each time window of transactions may be considered independently, and thus, each time window may be equally weighted.

To reduce the size of a data set used to train a fraud detection model and perform inferences using the trained fraud detection model and consider time relationships between different groups of transactions, embodiments discussed herein may divide a timeline of a user's transaction history into a plurality of variable length time segments. As illustrated in FIG. 2C, timeline 200C may be divided into a plurality of time segments in which transaction records are organized. The plurality of time segments may have different lengths based on when the transaction occurred on this timeline. As illustrated, four time segment lengths may be configured for this timeline. The recent transactions may have a first window size, the recent transaction time segment length, which is the shortest time segment length in the timeline 200. Less recent transactions may be grouped into ragged tensors using a second window size, the less recent transaction time segment length, which may be longer than the first window size. Historical transactions, representing transactions associated with the user that occurred prior to the beginning of the less recent transactions time segments, may be grouped into ragged tensors using a third window size. The third window size may be longer than the second window size. Finally, the earliest transactions in the user's transaction history may be grouped into a single time segment corresponding to "long ago" transactions.

In this example, transactions in timeline 200 may be grouped into a plurality of ragged tensors associated with the first window size, a plurality of ragged tensors associated with the second window size, a plurality of ragged tensors associated with the third window size, and a single ragged tensor associated with the remaining transactions in the training data set. The different window sizes may be defined, as discussed above, in a splitting vector identifying a number of vectors to generate with each window size and a length of the window size.

For example, timeline 200 may be divided into four ragged tensors of the first window size, four ragged tensors of the second window size, two ragged tensors of the third window size, and a single ragged tensor for the remaining transactions.

It should be recognized, however, that timeline 200 may be divided into any number of ragged tensors, and each ragged tensor may cover any time segment that does not overlap with the time segment associated with a different ragged tensor. In some embodiments, a ragged tensor may not include any transaction records. In such a case, the ragged tensor may be represented by a single vector having a reserved set of values (e.g., all "0" values for each feature in the vector, the reserved "NULL" value for each feature in the vector, or the like).

Example Reduction of a Ragged Tensor of Transactions into a Representative Vector for a Time Segment FIG. 3 illustrates an example 300 of reducing ragged tensors associated with variable-length time segments in the training data set to single representative vectors. As illustrated, max pooling layer 140 may receive a plurality of ragged tensors 310A-310Z. Each ragged tensor 310A-310Z may include a variable number of vectors, with each vector representing a different transaction in the training data set. As illustrated, ragged tensor 310A may be the largest of ragged tensors 310A-310Z, followed by ragged tensor 310D, ragged tensor 310B, ragged tensor 310C, and ragged tensor 310Z. For example, ragged tensor 310A may include five transaction vectors; ragged tensor 310B may include three transaction vectors; ragged tensor 310C may include two transaction vectors; ragged tensor 310D may include four transaction vectors; and ragged tensor 310Z may include a single transaction vector.

Max pooling layer 140 generally reduces each of the ragged tensors 310A-310Z into a representative vector 320A-320Z. Each representative vector 320A-320Z may be a single vector representing the plurality of vectors included in each ragged tensor 310A-310Z. To generate a representative vector from a respective ragged tensor, max pooling layer 140 can select the maximum value for each feature across each of the vectors included in the respective ragged tensor. Where a ragged tensor includes a single vector (e.g., as illustrated in ragged tensor 310Z), the representative vector may be identical to the ragged tensor. Otherwise, where a ragged tensor includes multiple vectors (e.g., ragged tensors 310A, 310B, 310C, and 310D illustrated in FIG. 3), the resulting representative vectors may include feature values from any of the vectors included in the ragged tensor.

Figure 4:
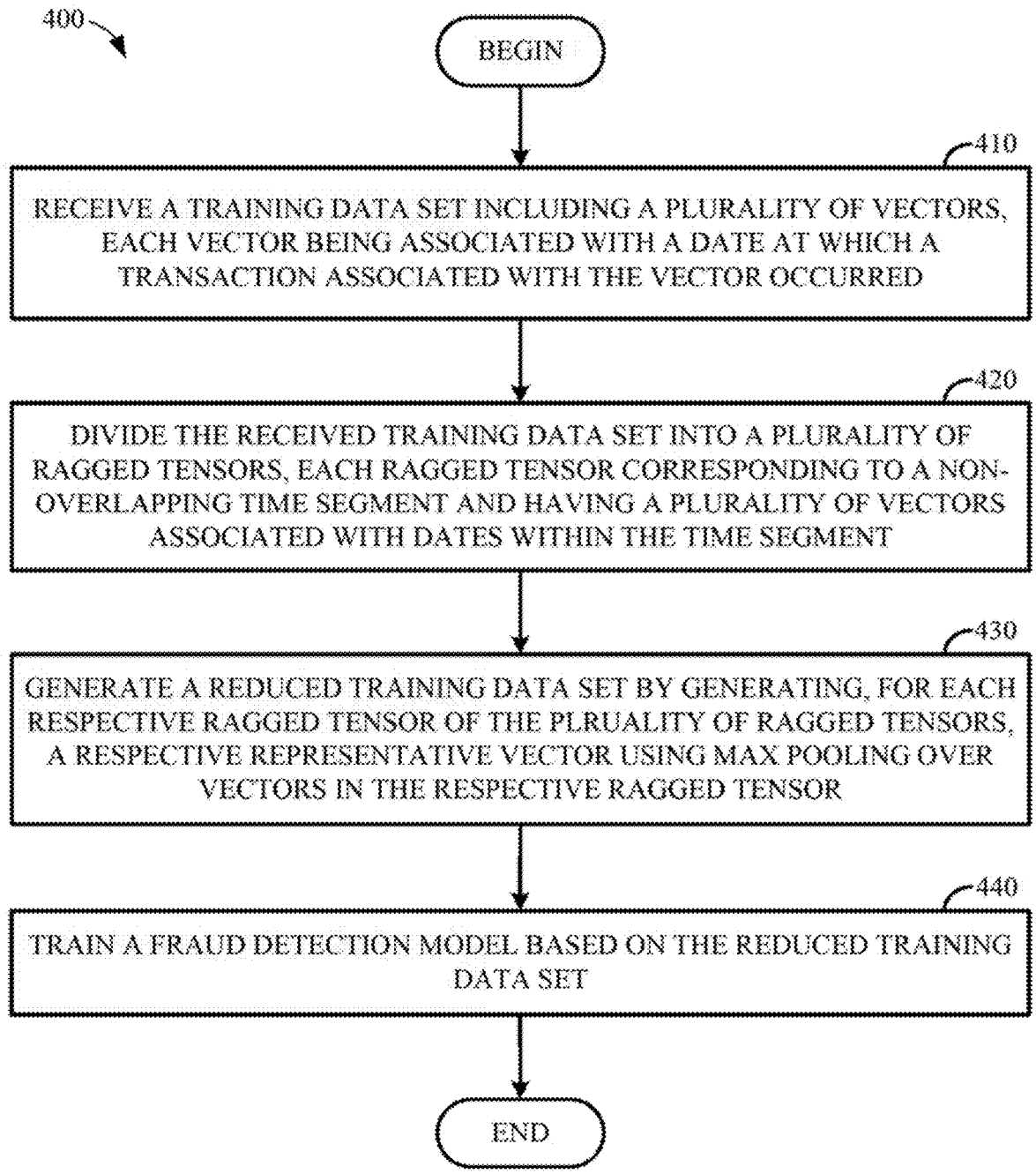
FIG. 4 illustrates example operations for training a fraud detection model using a training data set of transactions organized into variable length time windows is used to train a fraud detection model.

Example Training of a Fraud Detection Model Using a Training Data Set Organized into Variable Length Time Segments FIG. 4 illustrates example operations 400 that may be performed by a system (e.g., a system 600 illustrated in FIG. 6) to train a fraud detection model using training data set of transactions organized into variable length time segments.

As illustrated, operations 400 begin at block 410, where a system receives a training data set. The training data set generally includes a plurality of vectors. Each vector is generally associated with a date at which a transaction associated with the vector occurred and other information about the transaction that may be used in identifying fraudulent and legitimate transactions. As discussed, this additional information may include numerical data, such as the amount of a transaction, and categorical data, such as the payment method used to settle the transaction, a type of a specific payment method (e.g., a type of credit card used to settle the transaction), and the like.

In some embodiments, the system can perform various pre-processing operations on the received training data set prior to training a fraud detection model using the training data set (or data derived therefrom).

For example, to generate a training data set of numerical values that can be used to train a neural network, categorical data may be embedded into numerical values. Generally, a categorical feature can be embedded into n embedding values, where each unique set of embedding values represents a particular value of a categorical feature (i.e., such that $\{v_1, v_2, v_3, \ldots v_n\}$ corresponds to a first categorical feature, $\{v_{1m}, v_{2m}, v_{3m}, \ldots, v_{nm}\}$ corresponds to a second categorical feature, and so on). Numerical features in each vector in the training data set may be concatenated with the embedded categorical features such that the resulting vectors comprise vectors of variable length (e.g., having a variable number of features). Generally, the range of values for the embedded categorical features may be used by a max-pooling layer to reduce a ragged tensor to a representative vector, as discussed below.

The training data set may be generated based on a combination of transaction data associated with the user and transaction data associated with other users. The transaction data associated with the other users may include historical transaction data associated with similar users for a time period prior to a first transaction associated with the user.

At block 420, the system divides the received training data set into a plurality of ragged tensors. Each ragged tensor generally corresponds to a non-overlapping time segment. The vectors included in each ragged tensor may correspond to transactions associated with dates within a time segment associated with that ragged time segment. As discussed, the time segments may differ based on a distance from the current time for any given ragged time segment. Time segments closer to the current time may be associated with shorter time segments, while time segments further away from the current time may be associated with longer time segments. In some cases, one ragged tensor may include all transactions in the training data set prior to a threshold time, and the other ragged tensors may include transactions that occurred after the threshold time.

In some cases, the received training data set may be divided into the plurality of ragged tensors using a splitting vector. The splitting vector may include a plurality of demarcation indices. Each demarcation index generally identifies a number of ragged tensors to generate, a period of time over the identified number of ragged tensors is to be generated, and a period of time over which each ragged tensor of the identified number of ragged tensors is to include data from.

To generate a ragged tensor, a maximum length may be identified for vectors included in the non-overlapping time segment associated with the ragged tensor. The vectors in the ragged tensor may be modified by padding vectors included in the non-overlapping time segment other than vectors having the identified maximum vector length such that each vector in the respective ragged tensor has a same length.

In some cases, the system can generate the plurality of ragged tensors by splitting the received training data set using a one-dimensional splitting vector. A mapping function may be applied to vectors in each of the ragged tensors.

At block 430, the system generates a reduced training data set by generating, for each respective ragged tensor of the plurality of ragged tensors, a respective representative vector. Each respective ragged vector may be a single vector generated using max pooling over vectors in the respective ragged tensor. Generally, the respective ragged vector may include the maximum value of each feature over the vectors included in the respective representative vector. Where a ragged tensor includes a single vector, the respective representative vector may be identical to the single vector. In some embodiments, where a ragged tensor includes no vectors, indicating that no transactions were performed during the time segment associated with the ragged tensor, the respective representative vector may include zero or null values for each feature, a reserved value for each feature (e.g., a minimum or maximum value for the data type defined for each feature), or some other value indicating that no transactions were performed during the time segment.

To reduce a specific ragged tensor into a representative vector, a system can identify a maximum vector length for vectors included in the non-overlapping time segment associated with the ragged tensor. The system can then generate a padded set of vectors for the non-overlapping time segment associated with the ragged tensor by padding vectors included in the non-overlapping time segment other than vectors having the identified maximum vector length such that each vector in the respective ragged tensor has a same length. Vectors may be stacked to generate a batch of vectors with the same fixed length At block 440, the system trains a fraud detection model based on the reduced training data set. The fraud detection model may be implemented as a trained recurrent neural network that uses time relationships between the different ragged tensors to identify characteristics of fraudulent and legitimate transactions. For example, the fraud detection model may be implemented as a bi-directional long-short term memory (LSTM) model. A bi-directional LSTM model may be used because an LSTM preserves and recognizes temporal relationships in making a prediction of whether a transaction is legitimate or fraudulent. Thus, bi-directional LSTM can be used to recognize patterns of activity that may be indicative of fraudulent behavior, such as large gaps in time between successive transactions, irregularity in a pattern of transactions, and the like.

In some cases, the system can train the fraud detection model in a distributed manner. To do so, different time periods corresponding to different ragged tensors can be processed on different processors. For example, ragged tensors corresponding to shorter time periods or having a smaller number of vectors can be processed on more power-efficient processors, while ragged tensors corresponding to longer time periods or having a larger number of vectors can be processed on higher performance processors (e.g., dedicated neural processing units, tensor processing units, graphics processing units, or other parallel compute processors).

Figure 5:
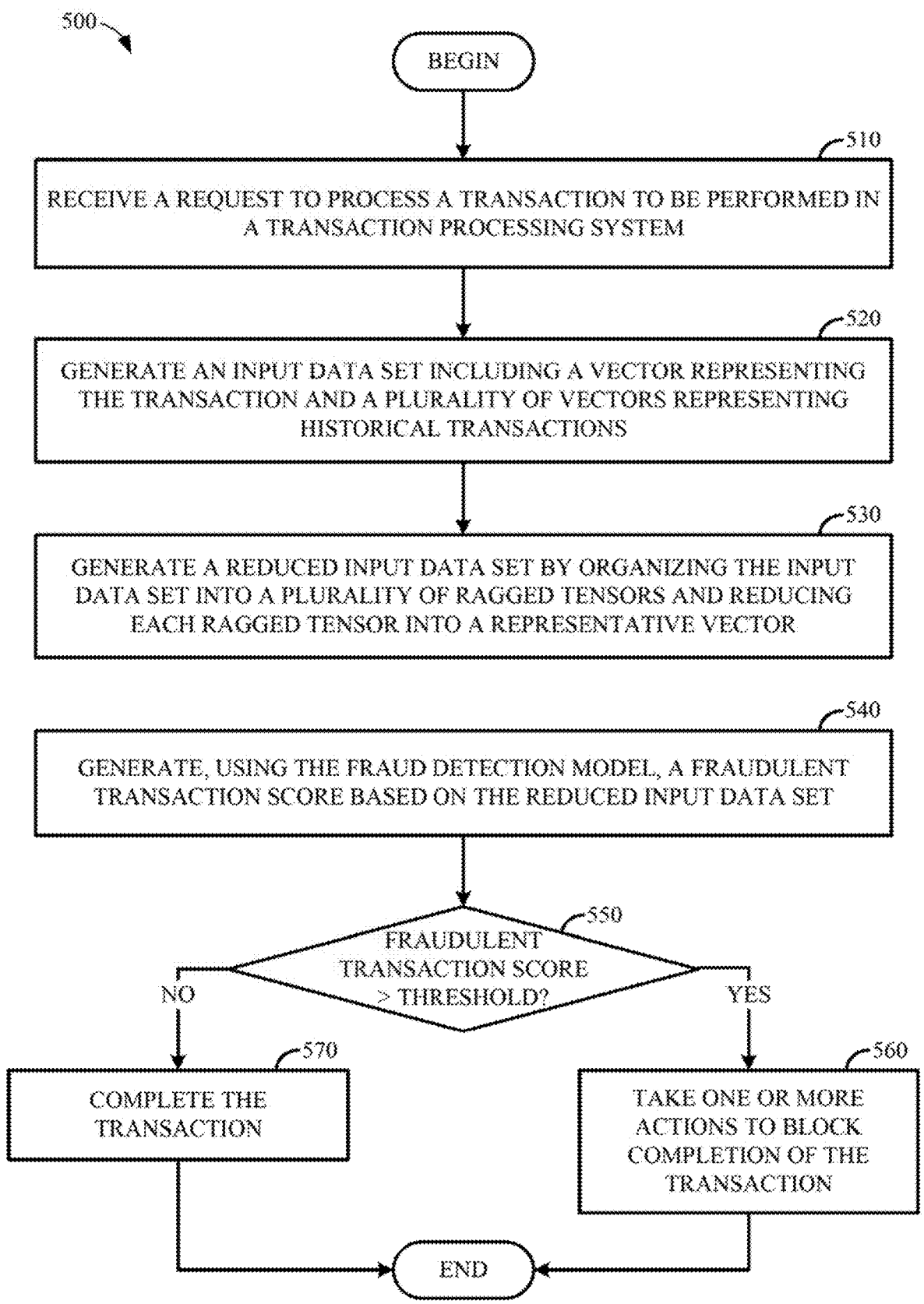
FIG. 5 illustrates example operations for processing a transaction based on a fraudulent transaction probability score generated by a fraud detection model trained on a training data set of transactions organized into variable length time windows.

Example Transaction Processing Using a Fraud Detection Model Trained Using a Training Data Set of Transactions Organized into Variable Length Time Segments FIG. 5 illustrates example operations 500 that may be performed by a transaction processing system (e.g., operating on system 600 illustrated in FIG. 6) for processing a transaction using a fraud detection model trained using a training data set of transactions organized into variable length time segments.

As illustrated, operations 500 may begin at block 510, where a transaction processing system receives a request to process a transaction to be performed in the transaction processing system. The transaction may be received and processed in parallel with transaction processing operations at a transaction processor associated, for example, with a payment processor or other payment gateway. Generally, as discussed in further detail below, a prediction of whether a transaction is legitimate or fraudulent may be used to prevent fraudulent transactions from occurring, even when the transaction is allowed by the transaction processor associated with the payment processor or other payment gateway.

Generally, the request may include a plurality of features that may be organized into a vector that can be processed by a trained fraud detection model to determine whether a transaction is likely to be a legitimate transaction or a fraudulent transaction. The features may include numerical features, such as the amount of the transaction and a datestamp, which may not need further processing in order to be used by a trained fraud detection model. The features may also include categorical features, such as a payment method for the transaction, a type of credit card used for the transaction, or the like, which may be converted into one or more embedded categorical values for use by the fraud detection model. Generally, the categorical features included in the request may be replaced with the embedded categorical features, and the numerical features and embedded categorical features can be concatenated into a single vector associated with the transaction in the request.

At block 520, the transaction processing system generates an input data set including a vector representing the transaction and a plurality of vectors representing historical transactions associated with a user. The plurality of vectors representing historical transactions associated with a user may include all transactions associated with the user, starting with an initial transaction representing when the user began using the transaction processing system. In some embodiments, where a user has a limited transaction history, transactions from similar users may be used to augment the historical transactions associated with the user. Various pre-processing actions may be performed to normalize the size of each vector included in the input data set and replace non-numerical data in the input data set with numerical data. For example, a categorical feature embedder can replace categorical features (e.g., types of credit cards used to perform a transaction) with numerical data. Other vectors may be padded with null data, zero values, or the like for fields for which no data exists so that the vectors in the input data set have a same number of features.

At block 530, the transaction processing system generates a reduced input data set by organizing the input data set into a plurality of ragged tensors and reducing each ragged tensor into a representative vector. As discussed, the plurality of ragged tensors may include tensors corresponding to different time windows of the input data set. In some cases, the time windows may be defined such that older transactions are organized into a smaller number of time windows than later transactions in the user's transaction history. Each ragged tensor may include a variable number of transaction vectors corresponding to the number of transactions performed within each time window. After the ragged tensors are generated, the ragged tensors may be reduced into individual representative vectors (e.g., using max pooling or other techniques) so that each time window is represented by a single vector.

At block 540, the transaction processing system uses the fraud detection model to generate a fraudulent transaction score based on information about the transaction included in the received request.

At block 550, the system determines whether the fraudulent transaction score exceeds a threshold score. Generally, a fraudulent transaction score that exceeds the threshold score indicates a likelihood that the transaction is a fraudulent transaction, while a fraudulent transaction score that is less than the threshold score indicates a likelihood that the transaction is a legitimate transaction. In some embodiments, a fraudulent transaction score may be normalized (e.g., to a range between a defined minimum and defined maximum value) prior to determining whether the fraudulent transaction score exceeds the threshold score. The normalization may be mapped to an expected level of precision, which may be a false positive rate defined a priori or otherwise known from a rate at which previous transactions flagged as potentially fraudulent are not reversed.

If, at block 550, the system determines that the fraudulent transaction score for the transaction exceeds the threshold, then operations 500 may proceed to block 560. At block 640, the transaction processing system takes one or more actions to block completion of the transaction. In some embodiments, the transaction processing system can terminate further processing operations for the transaction so that a transaction record is not generated for the transaction. The transaction processing system may generate an error message to be returned to a system that transmitted the request to process the transaction. The error message may indicate that the transaction failed and a reason why the transaction failed. In some embodiments, to prevent malicious parties from understanding the exact reasons why the transaction failed (e.g., that the transaction was flagged as likely fraudulent activity), the reason information in the error message may be generic or non-descriptive.

In some cases, where the transaction processing system operates in conjunction with another transaction processing system (e.g., a processing system at a payment processor) to process a transaction, the determination that the transaction is a fraudulent transaction may be used to augment the processing performed by the other transaction processing system.

In one example, the determination of whether the transaction is fraudulent may be used as a gating function to control when the other transaction processing system can begin processing the transaction. If the transaction processing system determines that the transaction is likely to be a fraudulent transaction, the other transaction processing system may never receive the transaction for processing.

In another example, where the transaction processing system and the other transaction processing system operate in parallel or substantially in parallel, a determination of whether the transaction is likely to be a fraudulent transaction may be used to reverse actions performed by the other transaction processing system. Suppose, for example, that the other transaction processing system has determined that the transaction is legitimate and that the fraudulent transaction score indicates that the transaction is, in fact, likely to be a fraudulent transaction. The other transaction processing system may have already authorized the transaction. Thus, the one or more actions to block the transaction may include issuing instructions to the other transaction processing system to reverse authorization of the transaction so as to revert to a state prior to the request to process the transaction.

In some embodiments, the transaction processing system may allow the transaction to be completed but may set a flag on the transaction to prevent a user from taking action with respect to the transaction until a predetermined amount of time elapses. For example, the flag may be used by the transaction processing system to block a user from withdrawing funds associated with the transaction until a time for performing a chargeback with respect to the transaction has passed.

If, at block 550, the transaction processing system determines that the transaction is likely to be a legitimate transaction (i.e., that the fraudulent transaction score does not exceed the threshold value), operations 500 may proceed to block 570. The threshold score may be a normalized score over which transactions are not processed. For example, a threshold score may be defined as 0.5, and transactions with fraudulent transaction scores over 0.5 (which indicates that there is a greater than 50% chance that a transaction is fraudulent) may be determined to be potentially fraudulent. At block 570, the transaction processing system completes the transaction. In some embodiments, completing the transaction may include committing a transaction record to a data repository, initiating one or more funds transfers from a payer to a seller, and the like.

Figure 6:
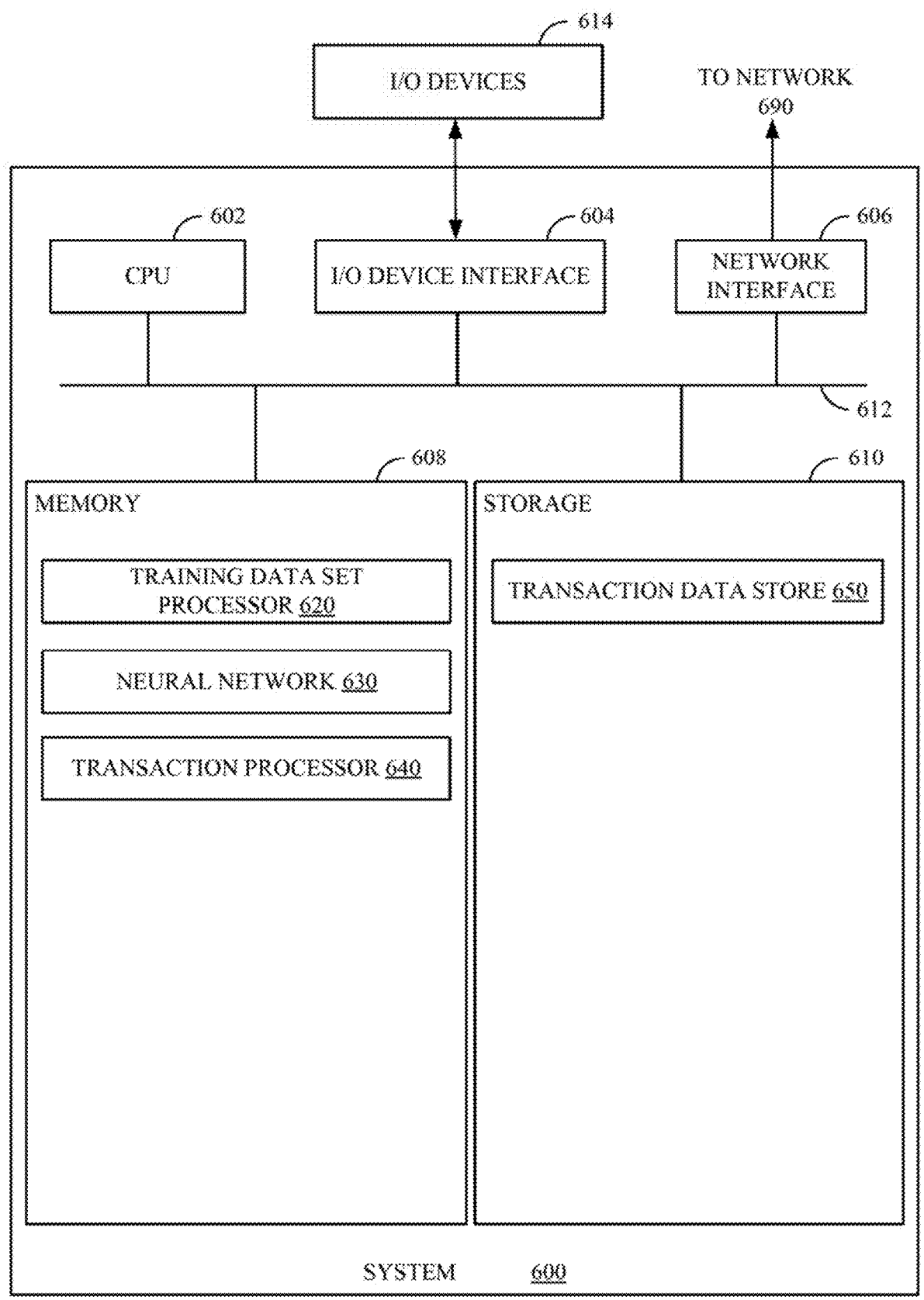
FIG. 6 illustrates an example computing system with which embodiments of the present disclosure may be implemented.

Example Systems for Training a Fraud Detection Model Using a Training Data Set of Transactions Organized into Variable Length Time Segments and Processing Transactions Using the Trained Fraud Detection Model FIG. 6 illustrates an example system 600 that reduces the bit size of features in a training data set used to train a machine learning model.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to network 690 (which may be a local network, an intranet, the internet, or any other group of computing devices communicatively connected to each other), a memory 608, storage 610, and an interconnect 612. Though not shown, system 600 may also include one or more parallel compute units, such as a neural processing unit (NPU), tensor processing unit (TPU), application-specific integrated circuit (ASIC), a field programmable gate array (FPGA), or the like that can be used to train a machine learning model and perform inferences (e.g., generate predications of whether an incoming transaction is legitimate or fraudulent) using the trained machine learning model.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes a training data set processor 620, a neural network 630, and a transaction processor 640.

Training data set processor 620 is generally configured to generate a set of representative vectors from a training data set for use by neural network 630 to train a fraud detection model. The training data set may be a set of transactions for a user and may be retrieved from training data store 650. To generate the set of representative vectors, training data set processor 620 can generate embedded categorical feature values for categorical features in the training data set (e.g., non-numerical data selected from a predefined universe of valid values) and replace the categorical features in each vector in the training data set with the embedded categorical feature values. Training data set processor 620 can then divide the vectors into a plurality of ragged tensors, with each ragged tensor including a variable number of vectors and representing a variable time segment in the user's transaction history. These ragged tensors may be reduced into single representative vectors for each time segment using, for example, a max pooling layer, and the set of representative vectors may be output to neural network 630 for use in training a fraud detection model.

Neural network 630 uses the set of representative vectors generated by training data set processor 620 to train and deploy a fraud detection model used by transaction processor 640 to determine whether a transaction is fraudulent or legitimate. Generally, neural network 630 can train a recurrent neural network, such as a long-short term memory model, or other machine learning architecture that can generate predictions by taking into account temporal relationships in a training data set and an incoming item for which a prediction is requested. Once the fraud detection model is trained, the model may be deployed to a transaction processor 640 executing on the system 600 or on a remote system for use by transaction processor 640.

Transaction processor 640 uses the trained fraud detection model to determine whether an incoming transaction is likely to be a fraudulent or legitimate transaction and take action to process the transaction based on the determination. Generally, the fraud detection model can generate a score indicating, for example, a probability that a transaction is fraudulent or legitimate. If the score exceeds a fraudulent score threshold, transaction processor 640 can determine that the incoming transaction is likely to be fraudulent and can take one or more actions to block the transaction from being completed. For example, transaction processor 640 can terminate further processing of the incoming transaction, generate an error message, and instruct other transaction processing systems to reverse authorizations granted for the incoming transaction. If the score does not exceed the fraudulent score threshold, transaction processor 640 can complete the transaction.

Storage 610 is representative of a non-volatile memory, such as a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN). Storage 610, as illustrated, may include a training data store 650. Training data store 650 may include a plurality of records that may be used to train a machine learning model. The records stored in training data store 650 may be used by training data set processor 620 to generate a set of representative vectors used to train a fraud detection model, as discussed above.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for detecting fraudulent transactions in a transaction processing system, comprising:
   receiving a request to process a transaction;
   generating an input data set including a vector representing the transaction and a plurality of vectors representing historical transactions;
   dividing the input data set into a plurality of ragged tensors, each ragged tensor corresponding to a non-overlapping time segment of variable length and having a plurality of vectors associated with dates within the time segment, and the non-overlapping time segment of variable length being based on an amount of time prior to a time associated with the transaction such that a ragged tensor associated with historical transactions having timestamps closer to the time associated with the transaction covers a smaller amount of time than a ragged tensor associated with historical transactions having timestamps further from the time associated with the transaction;

generating a reduced input data set by generating, for each respective ragged tensor of the plurality of ragged tensors, a respective representative vector using max pooling over vectors in the ragged tensor;

generating, using a fraud detection model, a fraudulent transaction score based on the reduced input data set, wherein the fraud detection model comprises a machine learning model trained to predict a likelihood of a transaction being a fraudulent transaction based on representative tensors representing transactions recorded in non-overlapping variable length time windows; and processing the transaction based, at least in part, on the fraudulent transaction score, wherein processing the transaction comprises:
 determining that the transaction is likely to be a fraudulent transaction based on a comparison of the fraudulent transaction score to a threshold score;
 completing the transaction; and
 blocking a user from taking action with respect to the transaction until an amount of time has elapsed from the completing the transaction.

2. The method of claim 1, wherein processing the transaction comprises:
 transmitting, to an external transaction processing system, the received request;
 receiving a response indicating that the external transaction processing system has authorized the transaction; and
 based on a comparison of the fraudulent transaction score to a threshold score indicating that the transaction is likely to be a fraudulent transaction, transmitting one or more messages to the external transaction processing system to reverse authorization of the transaction.

3. The method of claim 1, further comprising:
 upon determining that the amount of time has elapsed from the completing the transaction, removing a block on the user taking action with respect to the transaction.

4. The method of claim 1, wherein:
 the request to process the transaction and each vector in the input data set comprises a plurality of numerical values and a plurality of categorical values; and
 generating the input data set comprises:
  converting the plurality of categorical values to a plurality of embedded categorical features in a range of numerical values,
  replacing the plurality of categorical features in the transaction and each vector in the input data set with the plurality of embedded categorical features.

5. The method of claim 4, further comprising:
 padding the vector representing the transaction and the plurality of vectors such that the transaction and the plurality of vectors have a same number of features.

6. The method of claim 1, wherein dividing the input data set into the plurality of ragged tensors comprises dividing the input data set using a splitting vector storing demarcation indices, each demarcation index identifying a number of ragged tensors to generate, a period of time over the identified number of ragged tensors is to be generated, and a period of time over which each ragged tensor of the identified number of ragged tensors is to include data from.

7. A system, comprising:
 a memory having instructions executable stored thereon; and
 a processor configured to execute the executable instructions in order to perform an operation for detecting fraudulent transactions in a transaction processing system:
  receive a request to process a transaction;
  generating an input data set including a vector representing the transaction and a plurality of vectors representing historical transactions;
  dividing the input data set into a plurality of ragged tensors, each ragged tensor corresponding to a non-overlapping time segment of variable length and having a plurality of vectors associated with dates within the time segment, and the non-overlapping time segment of variable length being based on an amount of time prior to a time associated with the transaction such that a ragged tensor associated with historical transactions having timestamps closer to the time associated with the transaction covers a smaller amount of time than a ragged tensor associated with historical transactions having timestamps further from the time associated with the transaction;
  generate a reduced input data set by generating, for each respective ragged tensor of the plurality of ragged tensors, a respective representative vector using max pooling over vectors in the ragged tensor;
  generate, using a fraud detection model, a fraudulent transaction score based on the reduced input data set, wherein the fraud detection model comprises a machine learning model trained to predict a likelihood of a transaction being a fraudulent transaction based on representative tensors representing transactions recorded in non-overlapping variable length time windows; and
  process the transaction based, at least in part, on the fraudulent transaction score, wherein in order to process the transaction, the processor is configured to:
   determine that the transaction is likely to be a fraudulent transaction based on a comparison of the fraudulent transaction score to a threshold score;
   complete the transaction; and
   block a user from taking action with respect to the transaction until an amount of time has elapsed from the completing the transaction.

8. The system of claim 7, wherein in order to process the transaction, the processor is configured to:
 transmit, to an external transaction processing system, the received request;
 receive a response indicating that the external transaction processing system has authorized the transaction; and
 based on a comparison of the fraudulent transaction score to a threshold score indicating that the transaction is likely to be a fraudulent transaction, transmit one or more messages to the external transaction processing system to reverse authorization of the transaction.

9. The system of claim 7, wherein:
 the request to process the transaction and each vector in the input data set comprises a plurality of numerical values and a plurality of categorical values; and
 in order to generate the input data set, the processor is configured to:

convert the plurality of categorical values to a plurality of embedded categorical features in a range of numerical values, replace the plurality of categorical features in the transaction and each vector in the input data set with the plurality of embedded categorical features.

10. The system of claim 9, wherein the processor is further configured to:

pad the vector representing the transaction and the plurality of vectors such that the transaction and the plurality of vectors have a same number of features.

11. The system of claim 7, wherein in order to divide the input data set into the plurality of ragged tensors, the processor is configured to divide the input data set using a splitting vector storing demarcation indices, each demarcation index identifying a number of ragged tensors to generate, a period of time over the identified number of ragged tensors is to be generated, and a period of time over which each ragged tensor of the identified number of ragged tensors is to include data from.

12. The system of claim 1, wherein the fraud detection model comprises a bi-directional long-short term memory (LSTM) model.

13. The system of claim 1, wherein in order to process the transaction, the processor is configured to instruct an external transaction processing system to reverse authorization of the transaction.

14. The system of claim 7, wherein the fraud detection model comprises a bi-directional long-short term memory (LSTM) model.

15. The system of claim 7, wherein in order to process the transaction, the processor is configured to instruct an external transaction processing system to reverse authorization of the transaction.

* * * * *